United States Patent
Sato et al.

(10) Patent No.: US 7,876,872 B2
(45) Date of Patent: Jan. 25, 2011

(54) REACTOR POWER CONTROL APPARATUS OF NATURAL CIRCULATION REACTOR AND METHOD FOR CONTROLLING REACTOR POWER OF NATURAL CIRCULATION REACTOR

(75) Inventors: Koichi Sato, Naka (JP); Shin Hasegawa, Mito (JP)

(73) Assignee: Hitachi-GE Nuclear Energy, Ltd., Ibaraki-ken (JP)

( * ) Notice: Subject to any disclaimer, the term of this patent is extended or adjusted under 35 U.S.C. 154(b) by 50 days.

(21) Appl. No.: 11/678,753

(22) Filed: Feb. 26, 2007

(65) Prior Publication Data

US 2007/0201603 A1 Aug. 30, 2007

(30) Foreign Application Priority Data

Feb. 27, 2006 (JP) ............................. 2006-050915

(51) Int. Cl.
*G21C 7/06* (2006.01)
(52) U.S. Cl. ...................... 376/219; 376/214; 376/247; 376/245
(58) Field of Classification Search ................. 376/214, 376/219, 247, 245
See application file for complete search history.

(56) References Cited

U.S. PATENT DOCUMENTS

| 4,150,546 A | * | 4/1979 | Collett | 376/211 |
| 4,195,523 A | * | 4/1980 | Tasman et al. | 374/208 |
| 4,610,551 A | * | 9/1986 | Shah | 374/117 |
| 4,650,346 A | * | 3/1987 | Tehon | 374/117 |
| 4,655,992 A | * | 4/1987 | McKnight et al. | 376/247 |
| 4,734,249 A | * | 3/1988 | Utamura et al. | 376/214 |
| 4,876,059 A | * | 10/1989 | Conroy | 376/247 |
| 4,879,087 A | * | 11/1989 | Akiyama et al. | 376/216 |
| 5,271,044 A | * | 12/1993 | Hidaka et al. | 376/214 |
| 6,198,786 B1 | * | 3/2001 | Carroll et al. | 376/211 |
| 7,333,584 B2 | * | 2/2008 | Kitou et al. | 376/241 |
| 2001/0036242 A1 | * | 11/2001 | Hirukawa | 376/245 |

FOREIGN PATENT DOCUMENTS

JP 2004-150928 5/2004

* cited by examiner

*Primary Examiner*—Rick Palabrica
(74) *Attorney, Agent, or Firm*—Antonelli, Terry, Stout & Kraus, LLP.

(57) ABSTRACT

In the present invention, a reactor power control apparatus of a natural circulation reactor comprises a reactor pressure vessel which circulates cooling water using the density difference of the coolant inside, a feed water pipe which is connected to the reactor pressure vessel and supplies cooling water, a power control section which controls the reactor power using a control rod. The feed water pipe has an ultrasonic thermometer sensor. Driving of the control rod is controlled by the power control section based on the feed water temperature detected by the feed water thermometer. The reactor power control apparatus can detect the temperature of the feed water and perform drive control of the control rod preferentially, and obtain stable reactor power.

14 Claims, 4 Drawing Sheets

REACTOR POWER CONTROL APPARATUS OF NATURAL CIRCULATION REACTOR AND METHOD FOR CONTROLLING REACTOR POWER OF NATURAL CIRCULATION REACTOR

CLAIM OF PRIORITY

The present application claims priority from Japanese application serial no. 2006-050915, filed on Feb. 27, 2006, the content of which is hereby incorporated by reference into this application.

BACKGROUND OF THE INVENTION

The present invention relates to a reactor power control apparatus, and more particularly, to a reactor power control apparatus of a natural circulation reactor in which coolant is circulated by natural circulation and to a method for controlling reactor power of a natural circulation reactor.

Generally, reactors are largely divided into a forced circulation type and a natural circulation type based on a circulation of the coolant (cooling water). The forced circulation reactor includes a recirculation pump such as a jet pump or an internal pump or the like. This pump supplies forcibly cooling water into the core.

Meanwhile, the natural circulation reactor does not include a recirculation pump as in the case of the forced circulation reactor. The cooling water is circulated by the natural circulation force which is based on the difference in density of the cooling water outside of a core shroud which surrounds a core and two-phase flow including steam and cooling water inside the reactor shroud.

In the reactor, in the case where the temperature of the cooling water (feed water) that is supplied to the reactor via the feed water pipe is decreased by cooling water fed back from the purification system for example, the void in the reactor is collapsed and the reactor power increases. At this time, by inserting the control rod into the core, the reactor power is controlled so as to decrease. However, because response using control operation takes a long time, the reactor power sometimes increases despite control rod insertion.

For this reason, a technique is known in which, in the forced circulation reactor, the temperature of the feed water supplied to the reactor is detected, and the flow rate of the cooling water in the recirculation pump is controlled based on the this temperature such that the reactor power decreases (see Japanese Patent Laid-Open 2004-150928).

SUMMARY OF THE INVENTION

However, in the natural circulation reactor which does not include a recirculation pump, if the cooling water of which the temperature is reduced introduces into the reactor as it is, as described above, there is a problem in that the response resulting from control rod insertion does not occur in time, and the reactor power increases.

The object of the present invention provides a reactor power control apparatus of a natural circulation reactor which can detect the temperature of the feed water and preferentially perform drive control of the control rod, and generate stable reactor power.

The present invention for attaining the above object is characterized in that a reactor power control apparatus of the natural circulation reactor comprises a reactor pressure vessel which generates steam by natural circulation of cooling water internally, a feed water pipe which is connected to the reactor pressure vessel and supplies cooling water, and a power control section which controls the reactor power by a control rod, wherein the feed water temperature is detected and the power control reactor power is controlled by the power control.

Thus, operation of the control rod is preferentially controlled based on the temperature of the feed water. For example, by controlling the amount of the heating of the feed water, variation in the reactor power can be suppressed.

According to the reactor power control apparatus of the natural circulation reactor of the present invention, stable reactor power can be generated without great variation in reactor power.

According the method for controlling the reactor power of the natural-circulation reactor of the present invention stable reactor power can be generated without great variation in reactor power.

DESCRIPTION OF THE PREFERRED EMBODIMENT

Preferred embodiments of the reactor power control apparatus of the natural circulation reactor of the present invention will be described in the following with reference to the drawings. However, the present invention is not to be limited by these embodiments.

Figure 1:
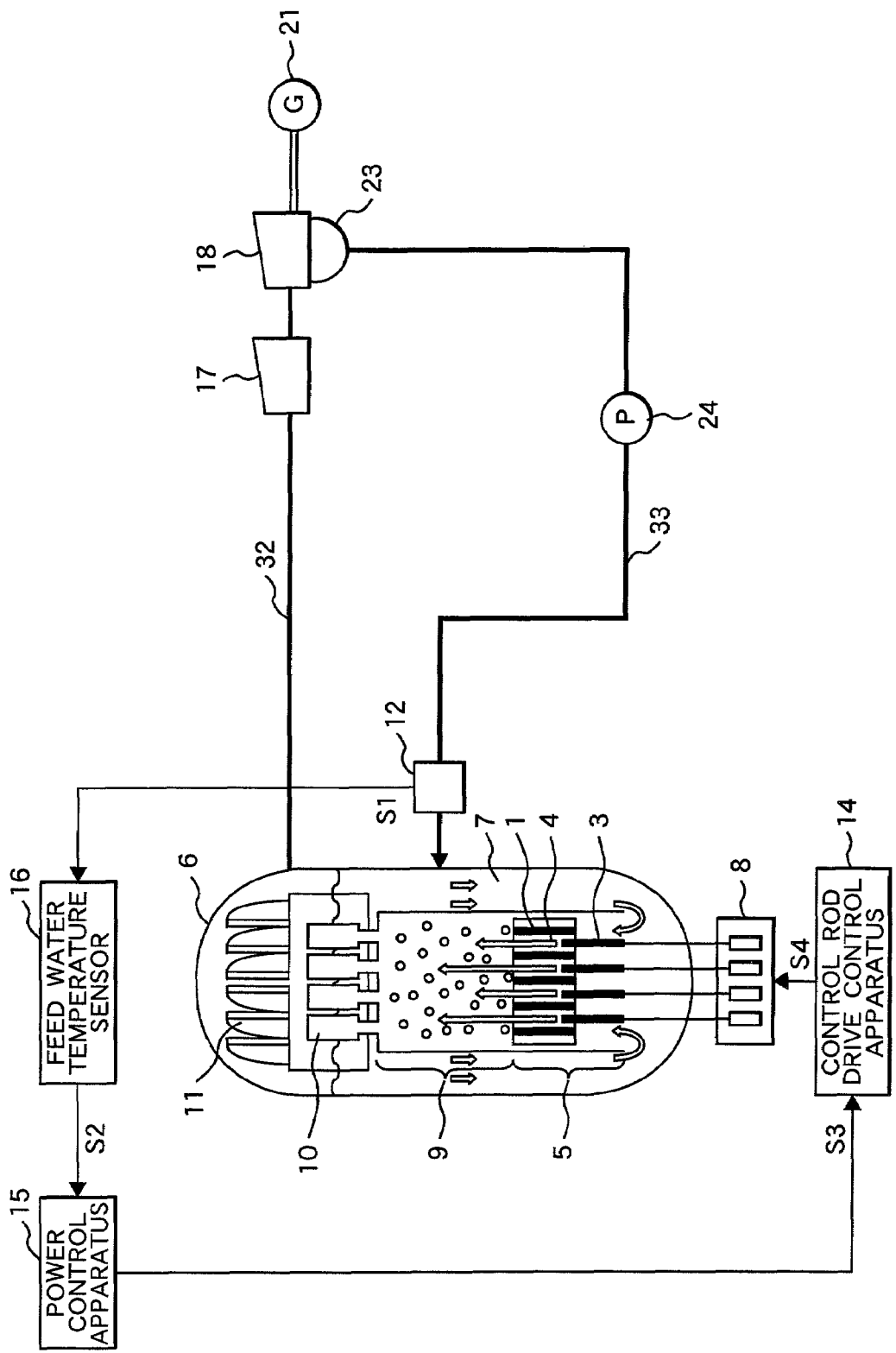
FIG. 1 is a structural diagram showing a generation system including the reactor power control apparatus of the natural circulation reactor of an embodiment of the present invention.

FIG. 1 is a structural diagram of an embodiment of a generation system including the reactor power control apparatus of the natural-circulation reactor of the present invention.

As shown in FIG. 1, the natural circulation reactor included in the generation system of this embodiment provides with fuel assemblies 1 loaded in the core 4 and a nuclear reactor vessel 6 which encloses a core 4 wherein a control rod 3 is inserted into in the core 4 to control the reactivity of the core 4.

The lower part of the reactor pressure vessel 6 has a control rod drive apparatus 8 which drives the control rod 3 in the vertical direction in the core 4 such that it can be inserted and withdrawn. A main steam pipe 32 and a feed water pipe 33 are connected to the reactor pressure vessel 6.

A cylindrical core shroud 5 is disposed so as to enclose the core 4. As a result, a ascending paths in which the coolant ascends in the direction of the arrow in the drawing is formed in the core shroud 5. A downcomer 7 that are descending paths in which the coolant descends is formed outside the core shroud 5. The cylindrical chimney 9 is disposed at the upper apparatus of the core shroud 5. A steam separator 10 and a steam dryer 11 are provided at the upper side of the chimney 9.

The coolant undergoes natural circulation force due to the difference in density between the coolant that is the two phase gas-liquid, boiled in the core 4 and ascending in the chimney 9 and the coolant that is liquid phase, descending in the downcomer 7. In the reactor pressure vessel 6, a circulation path that the coolant descends down the downcomer 7 and then ascends in the core 4 and the chimney 9, and the coolant separated the steam by the steam separator 10 descends in the downcomer 7 another time, is formed.

At the steam drier 11, the tiny water droplets are removed from the steam that is separated at the steam-water separator 10, and then the steam is supplied to the high-pressure turbine 17 and then introduced to the low-pressure turbine 18 via the main steam pipe 32. The steam introduced to the low-pressure turbine 18 is converted to rotational energy for the turbine. A generator 21 connected to the low-pressure turbine 18 is rotated and the power is generated.

The steam that rotated the low-pressure turbine 18 is condensed at the steam condenser 23 which has a cooling source and the steam becomes condensed water (cooling water). The condensed water which was condensed at the steam condenser 23 is passed through the feed water pipe 33 having the feed water pump 24 and returned to the inside of the reactor pressure vessel 6.

An ultrasonic thermometer sensor 12 is provided in the feed water pipe 33 as the feed water temperature detection apparatus. The ultrasonic thermometer sensor 12 is preferably placed as close as possible to the reactor pressure vessel 6. By placing the ultrasonic thermometer sensor 12 in the immediate vicinity of the reactor pressure vessel 6 in this manner, the temperature of the cooling water immediately before being supplied to the reactor pressure vessel 6 can be accurately measured and operation of the control rod can be accurately performed. It is to be noted that the ultrasonic thermometer sensor 12 may also function as a flow meter for the cooling water.

The reactor power control apparatus of the natural circulation reactor in this embodiment provides with a control rod drive control apparatus 14 which drives the control rod drive apparatus 8, a reactor power control apparatus 15 which controls the control rod drive control apparatus 14 and a feed water temperature sensor 16 which measures the temperature of the feed water (cooling water).

The temperature detection signal S1 for the cooling water flowing through the feed water pipe 33 is output from the ultrasonic thermometer sensor 12. This temperature detection signal S1 is input into the feed water temperature sensor 16. The feed water temperature sensor 16 calculates temperature of the measured cooling water based on the input temperature detection signal S1. Next, the feed water temperature sensor 16 outputs the power control demand signal S2 based on the calculated temperature. The output power control demand signal S2 is input into the reactor power control apparatus 15.

The reactor power control apparatus 15 calculates the necessary amount of operation for the control rod 3 based on the input power control demand signal S2 and outputs the power adjustment demand signal S3. The power adjustment demand signal S3 is input to the control rod drive control apparatus 14. For example, in the case where a temperature detection signal S1 which means the temperature of the cooling water in the feed water pipe 33 has been decreased by 2° C. is output from the ultrasonic thermometer sensor 12, the power controller 15 outputs a power adjustment demand signal S3 which decreases the reactor power by about 1%.

The control rod drive control apparatus 14 outputs a control rod drive command signal S4 based on the input power adjustment demand signal S3. The control rod drive apparatus 8 operates the control rod 3 based on the input control rod drive command signal S4 has been input. In the case where the power adjustment demand signal S3 is a command signal for increasing the reactor power, control is performed by the control rod drive apparatus 8 such that the control rod 3 is withdrawn from the core 4. In the case where the power adjustment demand signal S3 is a command signal for decreasing the reactor power, control is performed by the control rod drive apparatus 8 such that the control rod 3 is inserted into the core 4.

According to the reactor power control apparatus of the natural circulation reactor of this embodiment, because the temperature of the cooling water immediately before flowing into the reactor pressure vessel 6 is detected by the ultrasonic thermometer sensor 12, and driving of the control rod is preferentially controlled based on the detected temperature, stable reactor power can be obtained without great variation in the reactor pressure.

In addition, in a method for controlling the reactor power of the natural-circulation reactor of this embodiment, because after the cooling water temperature immediately before flowing into the reactor pressure vessel 6 is detected by the ultrasonic thermometer sensor 12, driving of the control rod is preferentially controlled based on the detected temperature, stable reactor power can be obtained without great variation in reactor pressure.

Figure 2:
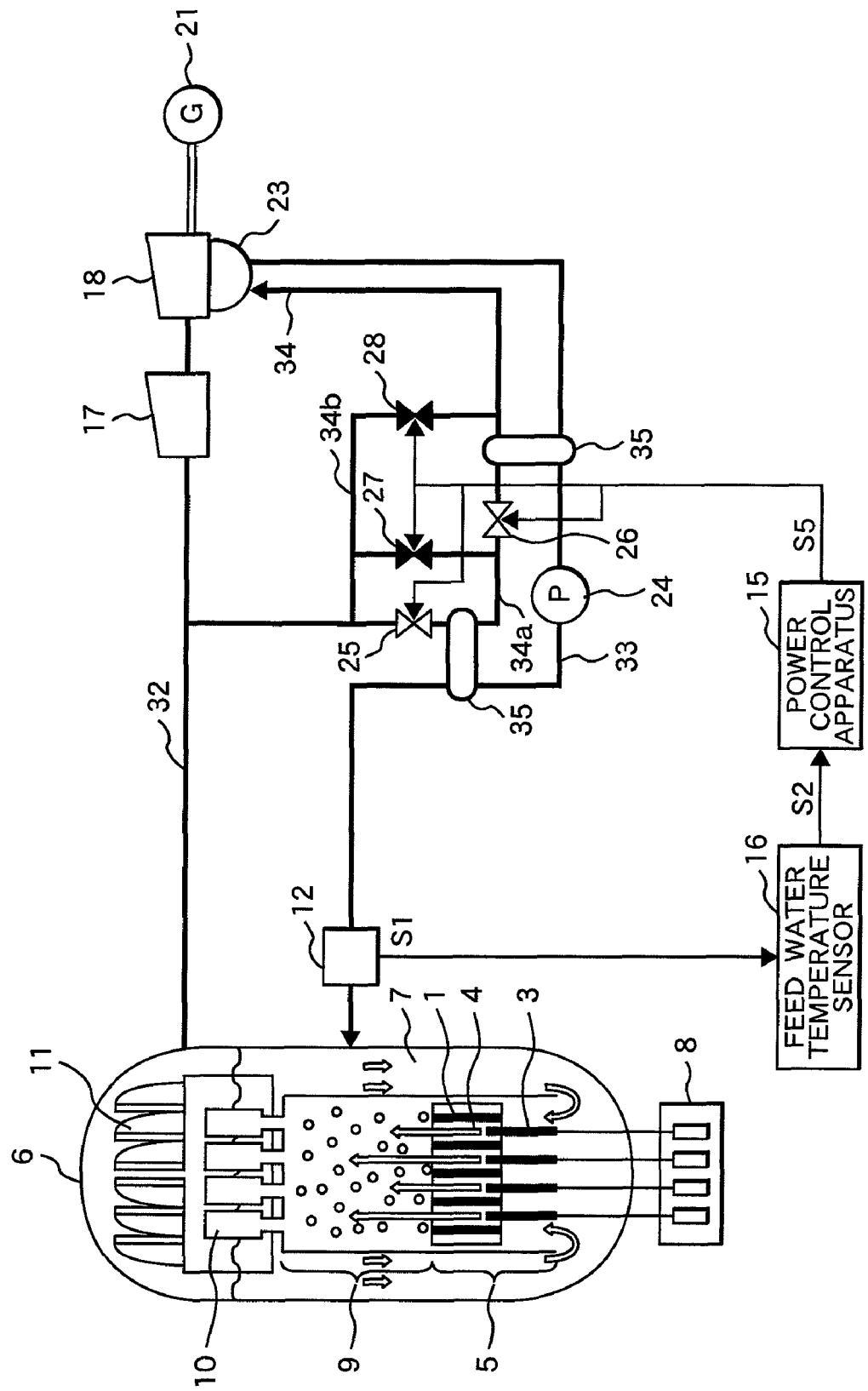
FIG. 2 is a structural diagram showing a generation system including the reactor power control apparatus of the natural circulation reactor of another embodiment of the present invention.

FIG. 2 is a structural diagram showing a generation system including the reactor power control apparatus of the natural circulation reactor of another embodiment of this invention.

The structure of this embodiment differing from the control system shown in FIG. 1 will be described hereinafter. The generation system of this embodiment provides with an extraction steam pipe 34 for heating the cooling water in the feed water pipe 33 and a heat exchanger 35. The extraction steam pipe 34 and the heat exchanger 35 are not provided in the generation system shown in FIG. 1. The extraction steam pipe 34 is provided so as to connect the main steam pipe 32 and the condenser 23. The extraction steam pipe 34 is branched at some point into the pipe 34a which is disposed along the feed water pipe 33 and the pipe 34b which is away from the feed water pipe 33. The heat exchanger 35 is placed so as to connect the feed water pipe 33 and the extraction steam pipe 34a.

A plurality of control valves 25 and 26 are provided in the pipe 34a of the extraction steam pipe 34, and a plurality of bypass valves 27 and 28 are provided in the pipe 34b. Normally, the degree of the opening of the control valves 25 and 26 is set so as to be large, while the opening of the bypass valves 27 and 28 are set so as to be small.

Due to this configuration, the high temperature steam generated at the reactor power vessel 6 is introduced into the extraction steam pipe 34 from the main steam pipe 32. The thermal energy from the high temperature steam is transmitted to the cooling water in the feed water pipe 33 via the heat exchanger 35. Thus, the temperature of the cooling water in the feed water pipe 33 increases. After the cooling water in the feed water pipe 33 is heated up, it is condensed at the condenser 23 and becomes condensed water.

When degree of the opening of the control valves 25 and 26 are set to become the fully closed state from the fully opened state and degree of the opening of the bypass valves are set to become fully opened state from fully closed state, the steam being introduced from the main steam pipe 32 into the pipe 34b is supplied into the steam condenser 23 without passing in the heat exchanger 35. Due to this configuration, setting can be done such that the temperature of the cooling water in the feed water pipe 33 is not increased. In addition, by causing the degree of the opening of the control valves 25 and 26 and the bypass valves 27 and 28 to be in tandem with each other, and setting them to a predetermined opening, the temperature of the cooling water in the feed water pipe 33 can be adjusted to a predetermind value.

The temperature detection signal S1 for the cooling water being introduced through the feed water pipe 33 is output from the ultrasonic thermometer sensor 12. This temperature detection signal S1 is input into the feed water temperature sensor 16. The feed water temperature sensor 16 calculates the cooling water temperature based on the input temperature detection signal S1 and generates the power control demand signal S2 based on the calculated temperature. The power control demand signal S2 is input into the reactor power control apparatus 15.

The reactor power control apparatus 15 calculates the degree of the opening of the control valves 25 and 26 the bypass valves 27 and 28 based on the input power control demand signal S2 and outputs the power adjustment demand signal S5. For example, in the case where a temperature detection signal S1 which means the temperature of the cooling water in the feed water pipe 33 has been decreased is output from the ultrasonic thermometer sensor 12, a power adjustment demand signal S5 which increases the degree of the opening of the control valves 25 and 26 more than the current valve position and decreases the degree of the opening of the bypass valves 27 and 28 more than the current valve position is output from the pressure controller 15. As a result, the temperature of the cooling water in the feed water pipe 33 can be increased because the amount of steam heat providing via the heat exchanger 35 can be increased.

In the case where a temperature detection signal S1 which means the temperature of the cooling water in the feed water pipe 33 has been increased is output, a power adjustment demand signal S5 which degreases the degree of the opening of the control valves 25 and 26 more than the current valve position and increases the degree of the opening of the bypass valves 27 and 28 more than the current valve position is output from the pressure controller 15. As a result, the temperature of the cooling water inside the feed water pipe 33 can be decreased because the amount of steam passing via the heat exchanger 35 can be decreased.

According to the reactor power control apparatus of the natural circulation reactor of this embodiment, because the temperature of the cooling water being supplied into the reactor pressure vessel 6 is detected by the ultrasonic thermometer sensor 12 and then the degree of the opening of the control valves 25 and 26 and the bypass valves 27 and 28 are controlled based on the detected temperature and the amount of steam being introduced into the heat exchanger 35 can be adjusted, stable reactor power can be obtained without great variation in reactor power.

According to the method for controlling the reactor power of the natural circulation reactor of this embodiment also, because the temperature of the cooling water being supplied into the reactor pressure vessel 6 is detected by the ultrasonic thermometer sensor 12 and then the degree of the opening of the control valves 25 and 26 and the bypass valves 27 and 28 are controlled based on the detected temperature and the amount of steam being introduced into the heat exchanger 35 can be adjusted, stable reactor power can be obtained without great variation in reactor power.

Figure 3:
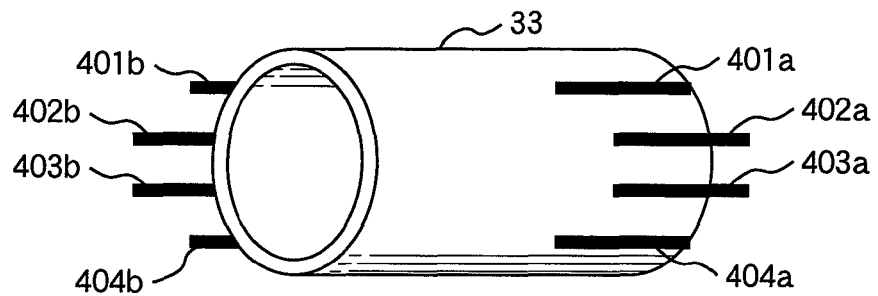
FIG. 3 is an enlarged view of the feed water temperature detection apparatus of the reactor power control apparatus of the natural circulation reactor of the present invention.

FIG. 3 is a perspective view of the feed water temperature detection apparatus of the reactor power control apparatus of the natural circulation reactor of this invention.

The feed water temperature detection apparatus shown in FIG. 3 has the ultrasonic thermometer sensor 12 and is used each generation system shown in FIGS. 1 and 2. As shown in FIG. 3, the ultrasonic thermometer sensor 12 includes eight ultrasonic sensors 401a-404a and 401b-404b. Each ultrasonic sensor is disposed along the outer peripheral surface of the feed water pipe 33. The ultrasonic sensors form pairs. In this embodiment, there are four pairs formed which are ultrasonic sensor 401a and ultrasonic sensor 401b; ultrasonic sensor 402a and ultrasonic sensor 402b; ultrasonic sensor 403a and ultrasonic sensor 403b; and ultrasonic sensor 404a and ultrasonic sensor 404b.

Figure 4:
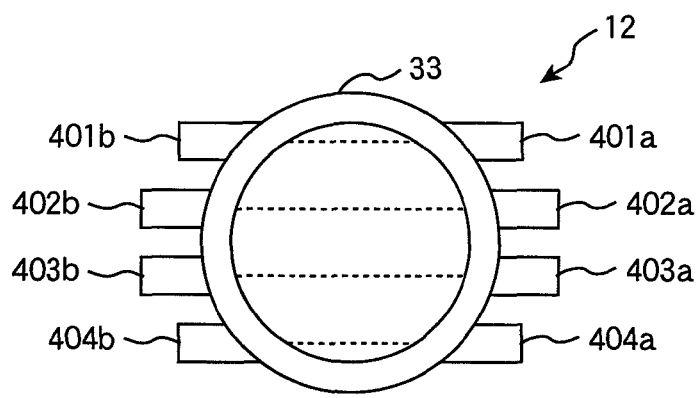
FIG. 4 is a front cross-sectional view of the feed water temperature detection apparatus shown in FIG. 3.

FIG. 4 is a cross-sectional view of the feed water temperature detection apparatus shown in FIG. 3.

As shown in FIG. 4, the pair of ultrasonic sensors 401a and ultrasonic sensor 401b is mounted at the upper portion of the feed water pipe 33 so as to oppose each other. The pair of ultrasonic sensors 402a and 402b is mounted so as to be a prescribed distance from the ultrasonic sensors 401a and ultrasonic sensor 401b. The pair of ultrasonic sensors 403a and ultrasonic sensor 403b and the pair of ultrasonic sensors 404a and ultrasonic sensor 404b are mounted in the same manner. That is to say, each pair of ultrasonic sensors are disposed so as to be parallel to each other at a prescribed interval along the outer peripheral surface of the feed water pipe 33.

According to the reactor power control apparatus of the natural circulation reactor of this embodiment, because an ultrasonic sensor is used as the ultrasonic detection apparatus of the feed water temperature detection apparatus, the temperature detection response for the cooling water passing in the feed water pipe 33 is quick and stable reactor power can be obtained without great variation in the reactor power.

In addition, even in the case for example, where low temperature cooling water flows into the feed water pipe 33 from the pipes of the cooling system and distributes in a lower portion in the feed water pipe 33 thereby a lower temperature layer is formed in the lower portion, because the four pairs of ultrasonic sensors are disposed on the outer peripheral surface of the feed water pipe 33 in parallel so as have a prescribed interval between them, the temperature distribution of the cooling water flowing through the feed water pipe 33 can be accurately measured. It is to be noted that the temperature measuring apparatus is not limited to the ultrasonic sensor and any apparatus which can measure the temperature distribution of the cooling water in the feed water pipe 33 can be used. By accurately measuring the temperature distribution of the cooling water, variation in reactor power can be controlled by the cooling water in low temperature region cooling water formed at a portion inside the feed water pipe 33.

Figure 5:
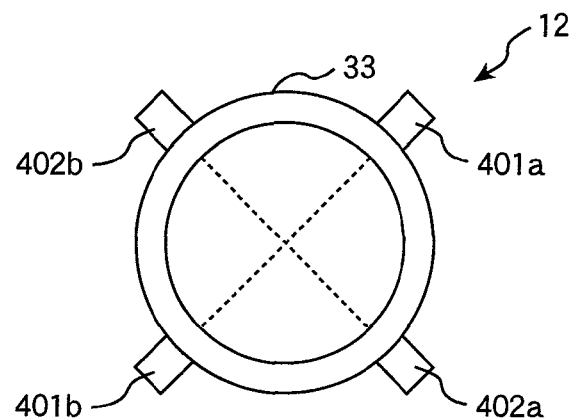
FIG. 5 is a front cross-sectional view showing another embodiment of the feed water temperature detection apparatus of the reactor power control apparatus of the natural circulation reactor of the present invention.

FIG. 5 is a cross-sectional view showing another embodiment of the feed water temperature detection apparatus of the reactor power control apparatus of the natural circulation reactor of the present invention.

The ultrasonic thermometer sensor shown in FIG. 5 is different from the ultrasonic thermometer sensor shown in FIG. 4 in that the pair of ultrasonic sensors 401a and 401b and the pair of ultrasonic sensors 402a and 402b are mounted on the outer peripheral surface of the feed water pipe 33 so as to cross each other. As a result, the temperature distribution of the cooling water formed in the cross-section vertical direction of the feed water pipe 33 can be measured by a smaller number of ultrasonic sensors.

Next, the principle of measuring the temperature of the cooling water in the feed water pipe 33 by using the pair of ultrasonic sensors 401a and 401b will be described. It is to be noted that the case in which one set of ultrasonic sensors is used will be described for convenience.

Figure 6:
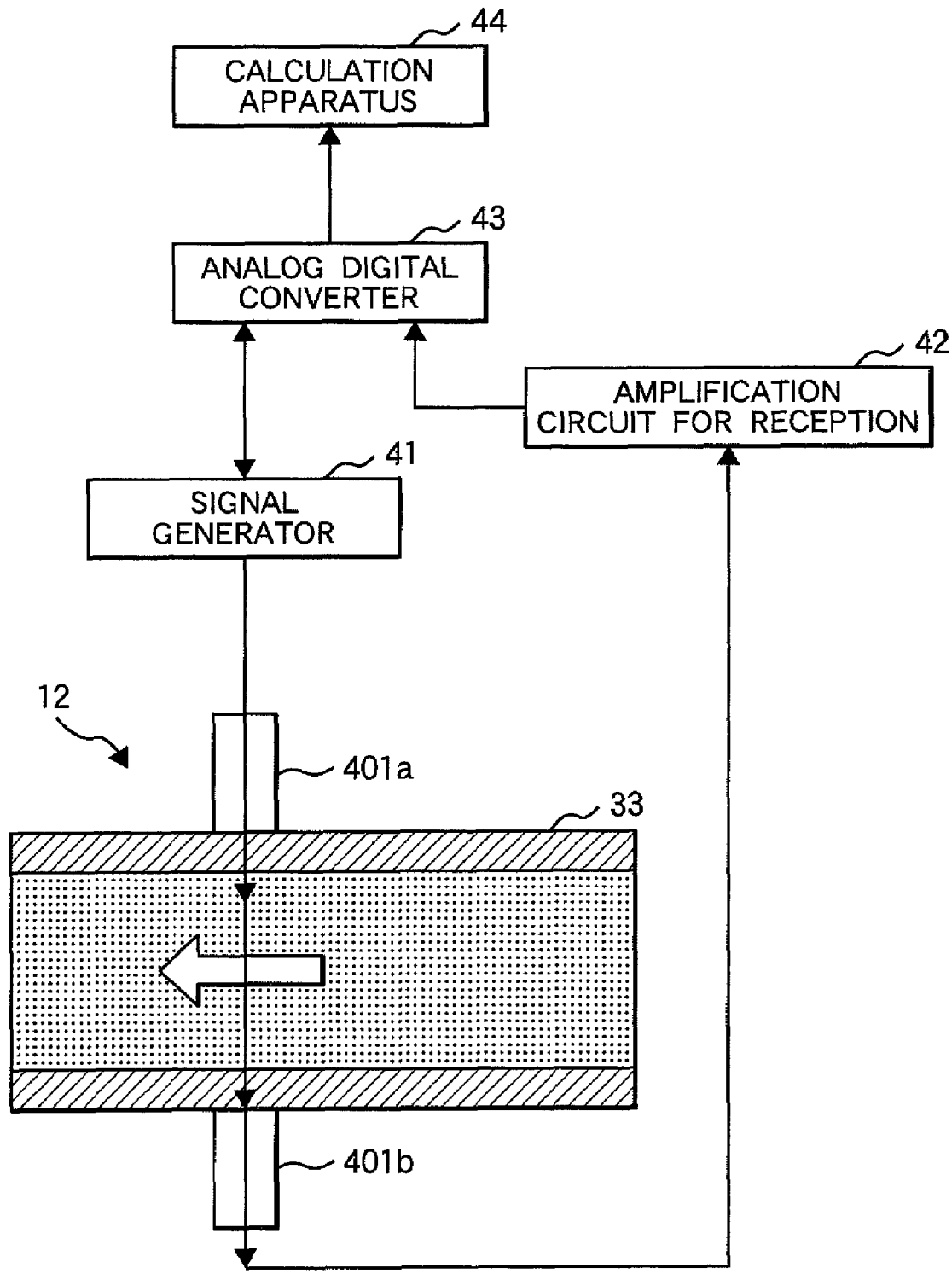
FIG. 6 is a side surface cross-sectional view showing the ultrasonic sensors used and mounted to the feed water pipe in the reactor power control apparatus of the natural circulation reactor of the present invention.

FIG. 6 is a side surface cross-sectional view in which one pair of ultrasonic sensors 401a and 401b used in the reactor power control apparatus of the natural circulation reactor of the present invention is mounted to the feed water pipe 33. As shown in FIG. 6, the cooling water flows in the arrow direction in the feed water pipe 33. It is to be noted that one set of ultrasonic sensors may be mounted so as to have a prescribed angle with respect to the feed water pipe 33. A hole may be formed in the feed water pipe 33 and the ultrasonic sensors mounted by welding.

In the feed water pipe 33, the pair of ultrasonic sensors 401a and 401b is disposed on the pipe surface and opposes the pipe diameter direction. The ultrasonic sensors 401a and 401b which form a pair have a built-in electromagnetic or piezoelectric ultrasonic transducer (not shown) which transmits ultrasonic waves. The ultrasonic sensors 401a and 401b are mounted to the outer surface of the feed water pipe by a mount apparatus or a clamp.

The pair of ultrasonic transducers disposed so as to oppose in the pipe diameter direction of the cooling water system pipe is formed such that one is for transmission (sending) and the other is for reception. The ultrasonic transducer for transmission is electrically connected to the signal generator 41 which generates a high-voltage pulsing voltage signal. When the high-voltage pulsing voltage signal is applied to the transmission ultrasonic transducer, the ultrasonic transducer for transmission converts the electric signal and generates ultrasonic waves. The generated ultrasonic waves are irradiated inside the feed water pipe 33 and passed through the cooling water in the pipe and then received by the ultrasonic transducer for reception.

The ultrasonic transducer for reception receives the ultrasonic waves that have been passed through the cooling water and converts them to echo electric signals. Then the converted eco-electric signals are amplified by an amplification circuit 42 for reception. It is then input into to an analog digital converter 43, and then converted to an echo digital signal by the analog digital converter 43 and taken into a calculation controller 44 that is built into the feed water temperature sensor 16.

The calculation controller 44 measures temperature of the fluid inside the pipe based on the difference in ultrasonic transit time detected at the ultrasonic transducer for reception and the relative positional relationship of the ultrasonic transducers.

It is to be noted that reactor power control apparatus of the natural circulation reactor of the present invention is not to be limited to the embodiments described above and as a matter of course, various modifications and changes can be made to the structure of the present invention in terms of use of other materials and configuration, without departing from the scope of the present invention.

What is claimed is:

1. A generation system having a natural circulation reactor comprising:
    a reactor pressure vessel of the natural circulation reactor having a core with a chimney disposed above the core, the core and the chimney being disposed in the reactor pressure vessel;
    a feed water pipe connected to the reactor pressure vessel and configured to supply feed water which flows therein to the reactor pressure vessel;
    a feed water temperature detection apparatus disposed at the feed water pipe and configured to detect a temperature of the feed water in the feed water pipe;
    a power controller section which outputs a power adjustment demand signal so as to control reactor power in accordance with the detected temperature of the feed water in the feed water pipe which is detected by the feed water temperature detection apparatus; and
    a control rod driving section which controls the reactor power by inserting and withdrawing a control rod with respect to the core in accordance with the power adjustment demand signal from the power controller section.

2. The generation system to claim 1, wherein the feed water temperature detection apparatus has a pair of ultrasonic sensors disposed at a position outside of the reactor pressure vessel so as to enable detection of the temperature of the feed water in the feed water pipe in proximity thereto.

3. The generation system according to claim 1, wherein the feed water temperature detection apparatus has a plurality of pairs of ultrasonic sensors disposed at a position outside of the reactor pressure vessel so as to enable detection of the temperature of the feed water in the feed water pipe in proximity thereto.

4. The generation system according to claim 3, wherein the plurality of the pairs of the ultrasonic sensors enable detection of a temperature distribution of the feed water in the feed water pipe in proximity thereto.

5. The generation system according to claim 3, wherein the plurality of the pairs of the ultrasonic sensors are disposed on an outer peripheral portion of said feed water pipe so as to be parallel to each other.

6. The generation system according to claim 5, wherein the plurality of the pairs of the ultrasonic sensors are disposed so as to have a prescribed interval between them.

7. The generation system according to claim 3, wherein the plurality of the pairs of the ultrasonic sensors are disposed on an outer peripheral portion of the feed water pipe so as to cross each other.

8. The generation system of claim 1, wherein the plurality of the pairs of the ultrasonic sensors are disposed at a position outside of and in the vicinity of the reactor pressure vessel so as to enable detection of the temperature of the feed water in the feed water pipe in proximity thereto.

9. The generation system according to claim 1, wherein the feed water pipe is arranged externally of the reactor pressure vessel.

10. The generation system according to claim 9, wherein the feed water temperature detection apparatus is disposed with respect to the feed water pipe at a position externally of said reactor pressure vessel so as to enable detection of the temperature of the feed water in the feed water pipe in proximity thereto.

11. A generation system according to claim 1, wherein the feed water pipe is connected to a condenser so as to enable supply of the feed water which flows within the feed water pipe from the condenser to the reactor pressure vessel.

12. A generation system according to claim 1, wherein the feed water temperature detection apparatus is disposed at a position of the feed water pipe externally of the reactor pressure vessel and adjacent thereto so as to detect the temperature of the feed water in the feed water pipe immediately before the feed water flows into the reactor pressure vessel.

13. A generation system according to claim 1, wherein the feed water pipe is connected to the reactor pressure vessel so as to supply feed water to an interior of the reactor pressure vessel without extending within the reactor pressure vessel to an inlet of the core within the reactor pressure vessel.

14. A generation system according to claim 1, wherein the feed water pipe supplies feed water to an interior of the reactor pressure vessel so that the feed water is mixed with water within the reactor pressure vessel and the temperature of the feed water which flows in the feed water pipe to the reactor pressure vessel is different from a temperature of the feed water which is mixed with the water within the reactor pressure vessel at least at an inlet of the core.

* * * * *